(12) United States Patent
Murota

(10) Patent No.: US 11,309,752 B2
(45) Date of Patent: Apr. 19, 2022

(54) METHOD OF MANUFACTURING MOTOR JACKET INCORPORATING STATOR

(71) Applicant: FANUC CORPORATION, Yamanashi (JP)

(72) Inventor: Masahiro Murota, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 320 days.

(21) Appl. No.: 16/661,284

(22) Filed: Oct. 23, 2019

(65) Prior Publication Data

US 2020/0136444 A1 Apr. 30, 2020

(30) Foreign Application Priority Data

Oct. 26, 2018 (JP) .............................. JP2018-201406

(51) Int. Cl.
*H02K 15/00* (2006.01)
*H02K 1/20* (2006.01)
*H02K 15/02* (2006.01)

(52) U.S. Cl.
CPC ............... *H02K 1/20* (2013.01); *H02K 15/02* (2013.01); *Y10T 29/49009* (2015.01)

(58) Field of Classification Search
CPC .......... H02K 9/22; H02K 15/12; H02K 15/02; H02K 15/14; Y10T 29/49009; Y10T 408/03; Y10T 428/31511

USPC ................... 29/596, 598, 604, 607, 729, 732
See application file for complete search history.

(56) References Cited

U.S. PATENT DOCUMENTS

| 2017/0256997 A1 | 9/2017 | Nakayama et al. |
| 2019/0149025 A1* | 5/2019 | Gastaldi ................ B29C 33/505 29/596 |

FOREIGN PATENT DOCUMENTS

| EP | 2894773 A1 | 7/2015 |
| JP | 2003079113 A | 3/2003 |
| JP | 2004357472 A | 12/2004 |
| JP | 2006223015 A | 8/2006 |
| JP | 2009201235 | * 9/2009 |
| JP | 2009201235 A | 9/2009 |
| JP | 2011050151 A | 3/2011 |
| WO | 2014141655 A1 | 9/2014 |
| WO | WO-2016035533 A1 | 3/2016 |

* cited by examiner

*Primary Examiner* — Thiem D Phan
(74) *Attorney, Agent, or Firm* — Robert P. Michal, Esq.; Carter, DeLuca & Farrell LLP

(57) ABSTRACT

A method of manufacturing a motor jacket incorporating a stator includes: the step of inserting the stator into a hole in the jacket that has a diameter larger than the outer diameter of the stator; the step of introducing an elastic adhesive into a gap between a surface of the hole and the stator; and the step of cooling the jacket for a given time after introducing the adhesive into the gap.

7 Claims, 5 Drawing Sheets

METHOD OF MANUFACTURING MOTOR JACKET INCORPORATING STATOR

CROSS-REFERENCE TO RELATED APPLICATION

This application is based upon and claims the benefit of priority from Japanese Patent Application No. 2018-201406 filed on Oct. 26, 2018, the contents of which are incorporated herein by reference.

BACKGROUND OF THE INVENTION

Field of the Invention

The present invention relates to a method of manufacturing a motor jacket in which a stator is incorporated.

Description of the Related Art

In the manufacture of motor jackets used for motors, a method called "shrink fit" is known as one method for incorporating a stator into a jacket. For a document concerning shrink fit, refer to International Publication WO 2016/035533, for example.

In the process of shrink fit, first, the jacket is thermally expanded by heating. The thermal expansion temporarily enlarges the diameter of the hole formed in the jacket. Next, a stator having an outer diameter that is equal to or larger than the diameter of the hole before being thermally expanded is inserted into the diameter-enlarged hole. Then, after the stator has been inserted in the hole of the jacket, the jacket is shrunk by being cooled or through natural heat radiation and the stator is accordingly pressed against the surface of the hole that attempts to return to the original diameter. The stator is thus incorporated in the motor jacket.

SUMMARY OF THE INVENTION

In such a motor jacket manufactured by shrink fit, the shrinking jacket applies strongly pressing stress to the stator. The stress may adversely affect the quality of the motor. Such adverse effects include distorting the shape of the stator, for example.

Accordingly, an object of the present invention is to provide a method for manufacturing a motor jacket incorporating a stator that can reduce stress applied from the jacket to the stator incorporated therein.

According to an aspect of the present invention, a method of manufacturing a motor jacket incorporating a stator includes: an insertion step of inserting the stator into a hole formed in the jacket; an introduction step of, after the insertion step, introducing an elastic adhesive into between an outer circumferential surface of the stator and a surface of the hole; and a cooling step of cooling the jacket for a given time after the introduction step.

According to the present invention, it is possible to incorporate the stator into the jacket with the axis of the hole of the jacket and the axis of the stator substantially coinciding with each other, and to reduce the stress applied from the jacket to the stator.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The method of manufacturing a motor jacket with a stator incorporated therein according to the present invention will now be described in detail in conjunction with preferred embodiments while referring to the accompanying drawings.

First Embodiment

Figure 1:
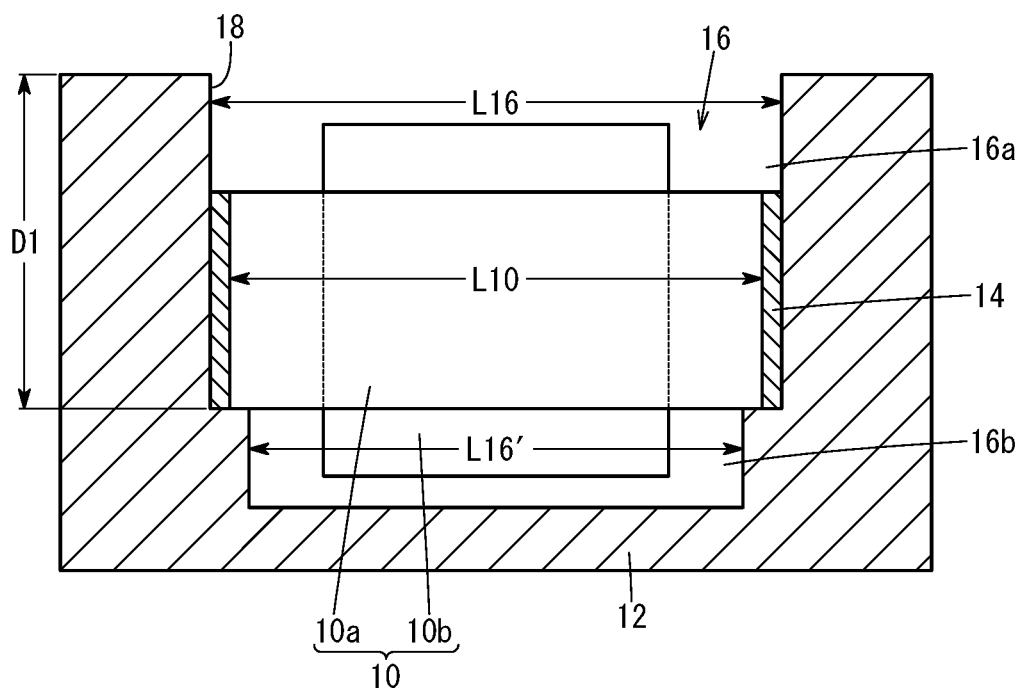
FIG. 1 is a cross section showing a stator incorporated in a jacket by a manufacturing method according to a first embodiment.

FIG. 1 is a cross section illustrating a stator 10 incorporated in a jacket 12 by a manufacturing method according to a first embodiment.

As shown in FIG. 1, the stator 10 having a stator core 10a and a winding portion 10b is inserted in a circular hole 16 formed in the jacket 12. The winding portion 10b is supported by the stator core 10a, and, when seen in the cross-sectional view of FIG. 1, the winding portion 10b has its one end and the other end protruded respectively above and below the stator core 10a. The stator 10 structured in this way is bonded to the jacket 12 by an adhesive 14 inside the hole 16. At this time, the stator 10 and the jacket 12 have their respective axes that substantially coincide with each other.

The hole 16 of the jacket 12 will be described in further detail. In the hole 16 formed in the jacket 12, a portion of the hole that extends from an opening end 18 of the jacket 12 to a first given depth D1 has a diameter L16 that is larger than an outer diameter L10 of the stator core 10a (or an outer diameter of the stator 10). Another portion of the hole that extends deeper than the first given depth D1 has a diameter L16' that is smaller than the outer diameter L10 of the stator 10.

The region inside the hole 16 from the opening end 18 of the jacket 12 to the first given depth D1 is hereinafter referred to as a first region 16a. Further, the region inside the hole 16 deeper than the first given depth D1 will be referred to as a second region 16b.

As shown in FIG. 1, the stator core 10a is accommodated in the first region 16a. A part of the winding portion 10b that is positioned below the stator core 10a in FIG. 1 is accommodated in the second region 16b. It is preferred that another part of the winding portion 10b that is positioned above the stator core 10a in FIG. 1 be also accommodated in the first region 16a.

A manufacturing method for obtaining the structure of FIG. 1 will be described below.

Figure 2:
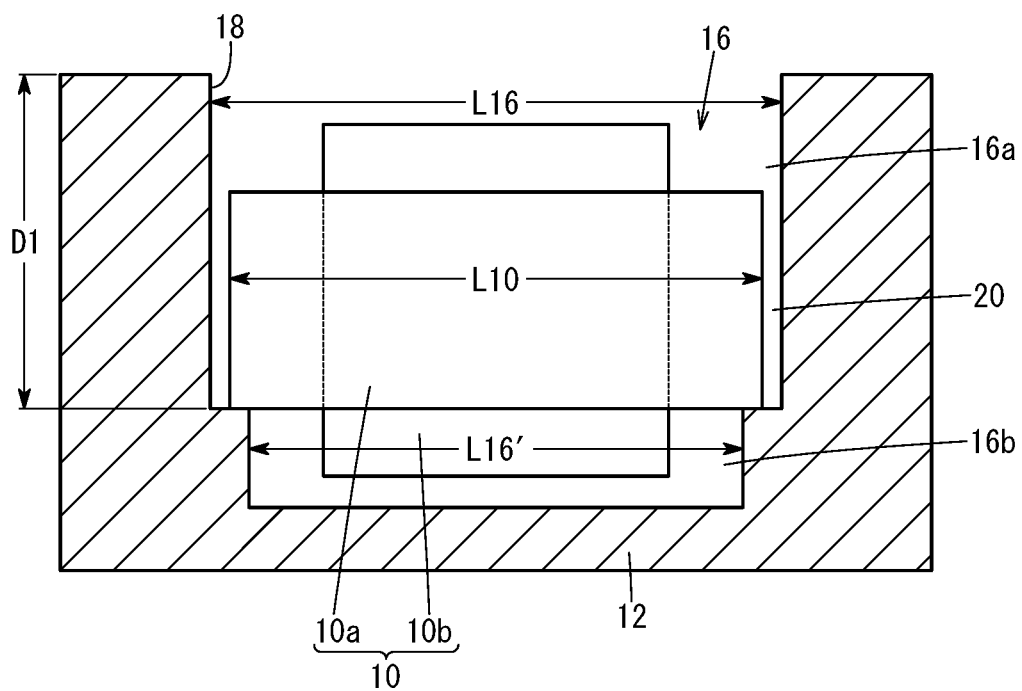
FIG. 2 is a cross section showing the stator just inserted in the jacket according to the first embodiment.

FIG. 2 is a cross section showing the stator 10 and the jacket 12 according to the first embodiment, where the stator 10 has been merely inserted in the jacket 12.

First, as shown in FIG. 2, the stator 10 is inserted into the hole 16 that is formed in the jacket 12 and that has the diameter L16 larger than the outer diameter L10 of the stator 10 (an insertion step). In this embodiment, the stator 10 comprises metal material. Also, the jacket 12 comprises metal material or resin material that exhibits a higher shrinkage ratio than the stator 10 when cooled.

The hole 16 is formed such that the first region 16a (extending from the opening end 18 of the jacket 12 to the first given depth D1) has a diameter L16 that is larger than the outer diameter L10 of the stator 10. Also, the hole 16 is formed such that the second region 16b (extending deeper than the first given depth D1) has a diameter L16' that is smaller than the outer diameter L10 of the stator 10.

The step of forming the hole 16 having desired diameters and depths in the jacket 12 (a hole forming step) can be achieved by any known method. The hole forming step will not therefore be described in this embodiment.

In this embodiment, it is easy to insert the stator 10 into the hole 16 because the diameter L16 of the hole 16 in the first region 16a is larger than the outer diameter L10 of the stator 10. It is therefore not necessary to thermally expand the jacket 12 before inserting the stator 10 therein. Further, the diameter L16' of the hole 16 in the second region 16b is smaller than the outer diameter L10 of the stator 10. This prevents the stator core 10a from being inserted deeper than the second region 16b.

The above-described insertion of the stator 10 into the hole 16 is achieved in such a manner that at least the side surface of the stator core 10a and the surface of the hole 16 (jacket 12) do not come in direct contact with each other. Thus, as shown in FIG. 2, a gap 20 is formed between the surface of the hole 16 and the stator 10 in the first region 16a.

Figure 3A:
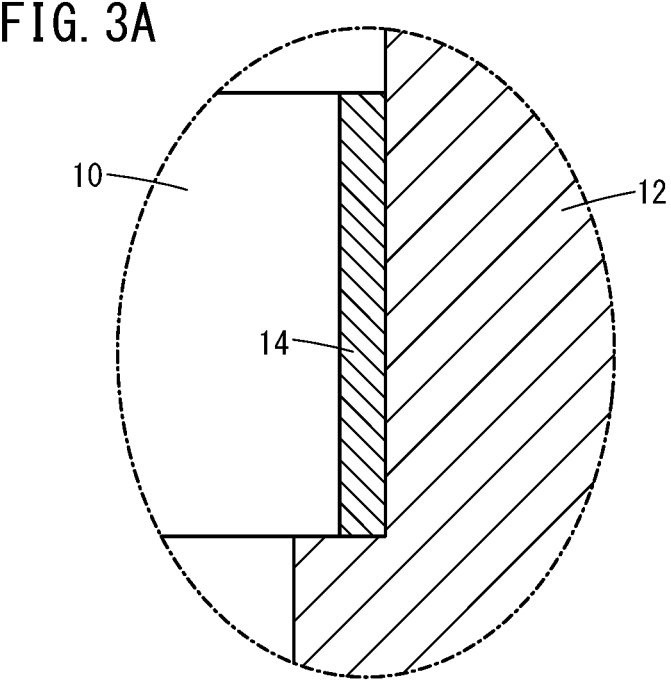
FIG. 3A is a partial enlarged cross section showing the stator and jacket with an adhesive introduced in a gap therebetween according to the first embodiment.

FIG. 3A is a partial enlarged cross section showing the gap 20 with the adhesive 14 just introduced therein, according to the first embodiment.

After the stator 10 has been inserted in the hole 16, the adhesive 14 is introduced into the gap 20 between the surface of the hole 16 and the stator 10 inserted in the hole 16 (an introduction step). Then, as shown in FIG. 3A, the adhesive 14 enters between the side surface of the stator 10 and the surface of the hole 16 (jacket 12), thereby bonding the stator 10 and the jacket 12 together. As mentioned above, the gap 20 is formed in such a manner that the side surface of the stator 10 and the surface of the hole 16 do not contact directly. Hence, the adhesive 14 introduced into the gap 20, too, prevents direct contact between the side surface of the stator 10 and the surface of the hole 16. The adhesive 14 has a higher elastic force than the stator 10 and jacket 12.

In this embodiment, the diameter L16' of the hole 16 in the second region 16b is smaller than the outer diameter L10 of the stator 10. Consequently, when the adhesive 14 is introduced, the stator 10 and the surface of the hole 16 prevent the adhesive 14 from entering the second region 16b.

Figure 3B:
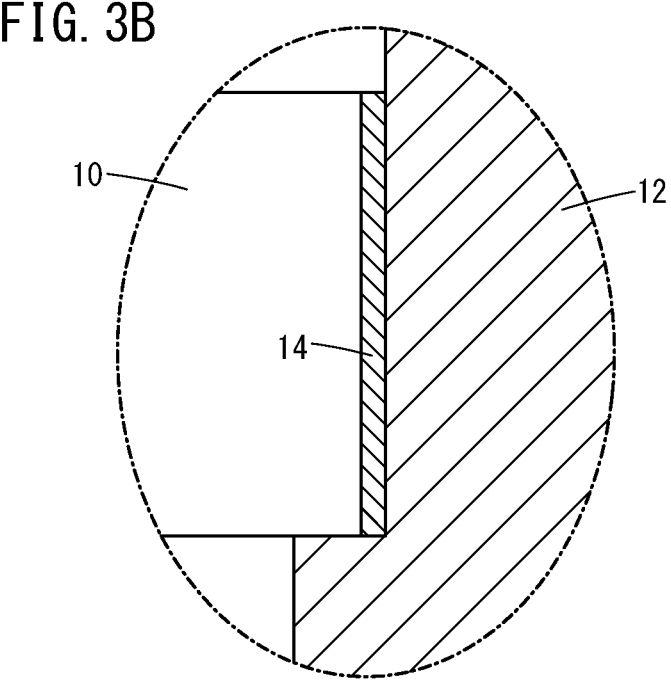
FIG. 3B is a partial enlarged cross section showing part of the stator and jacket after the jacket has shrunk by cooling.

FIG. 3B is a partial enlarged cross section showing the part of the jacket 12 after having shrunk by being cooled.

After the adhesive 14 has been introduced into the gap 20, the jacket 12 is cooled for a given time (a cooling step). As already mentioned, the jacket 12 is made of a material having a higher shrinkage ratio (when cooling) than the stator 10. Hence, as the jacket 12 is cooled, the jacket 12 applies radially pressing stress to the stator 10. Accordingly, as the jacket 12 is cooled, as shown in FIG. 3B, the thickness of the adhesive 14 in the radial direction becomes thinner than before being cooled (see FIG. 3A).

The application of radially pressing stress from the jacket 12 to the stator 10 causes the stator 10 and the jacket 12 to be bonded together reliably and suitably by the adhesive 14. In addition, at this time, the axis of the stator 10 shifts to such a position that the magnitude of the applied stress becomes equal all over the side surface of the stator 10, i.e., it shifts in a direction toward the axis of the hole 16. In this way, cooling the jacket 12 for a given time allows the axes of the stator 10 and the hole 16 to substantially coincide with each other.

In view of the quality of the motor, ideally the axis of the stator 10 and the axis of the hole 16 should coincide with each other when the stator 10 is incorporated in the jacket 12. On the other hand, forming the diameter L16 of the hole 16 in the first region 16a to be larger than the outer diameter L10 of the stator 10 makes it difficult to have the axes of the stator 10 and the hole 16 coincide and to maintain this condition, while it facilitates insertion of the stator 10. Accordingly, in this embodiment, as described above, the adhesive 14 is introduced into the gap 20 to bond the stator 10 and jacket 12 together. Then, the stress occurring as the jacket 12 shrinks is applied to the stator 10 through the adhesive 14. In this way, according to this embodiment, the axis of the stator 10 and the axis of the hole 16 substantially coincide with each other even though the diameter L16 of the hole 16 is larger than the outer diameter L10 of the stator 10. Furthermore, the adhesive 14 reduces the possibility that the shape of the stator 10 might be distorted by the stress.

As described above, according to this embodiment, the axes of the stator 10 and the hole 16 are made to substantially coincide by the stress generated by cooling the jacket 12, and in addition, the possibility that the shape of the stator 10 might be distorted by the stress is reduced.

After the jacket 12 has been cooled for a given time, the jacket 12 is warmed or left at normal temperature, for example, so that the jacket 12 expands and returns to the condition under normal temperature. Then, the structure as shown in FIG. 1 is obtained in which the stator 10 is incorporated in the jacket 12. In this process, the stator 10 and the jacket 12 are bonded by the adhesive 14, and hence, as the jacket 12 expands, stress is applied to the stator 10 so as to pull it radially. However, the magnitude of the stress is almost uniform all over the entire side surface of the stator 10, so that extremely large force is prevented from being applied to particular portions of the stator 10. Thus, suppressing application of extremely large force to particular portions of the stator 10 reduces the possibility of shift or deviation of the axis of the stator 10. Furthermore, according to this embodiment, the adhesive 14 between the stator 10 and the jacket 12 absorbs the stress and thus further suppresses application of extremely large force to particular portions of the stator 10. This prevents distortion of the shape of the stator 10, for example.

The stator 10 has been incorporated in the jacket 12 in this way. As described so far, this embodiment allows the stator 10 to be incorporated into the jacket 12 with the axis of the hole 16 of the jacket 12 and the axis of the stator 10 substantially coinciding with each other and also reduces the stress applied to the stator 10 from the jacket 12.

[Modifications]

The first embodiment has been described as an example of the present invention and it is of course possible to modify or improve the first embodiment in various ways. It is clear from recitation of claims that embodiments thus modified or improved are included in the technical scope of the present invention.

(First Modification)

For example, in the hole forming step, an adhesive reservoir where the adhesive stays (or is retained) may be formed in partial area of the surface of the hole 16 that faces the outer circumferential surface of the stator 10.

Figure 4:
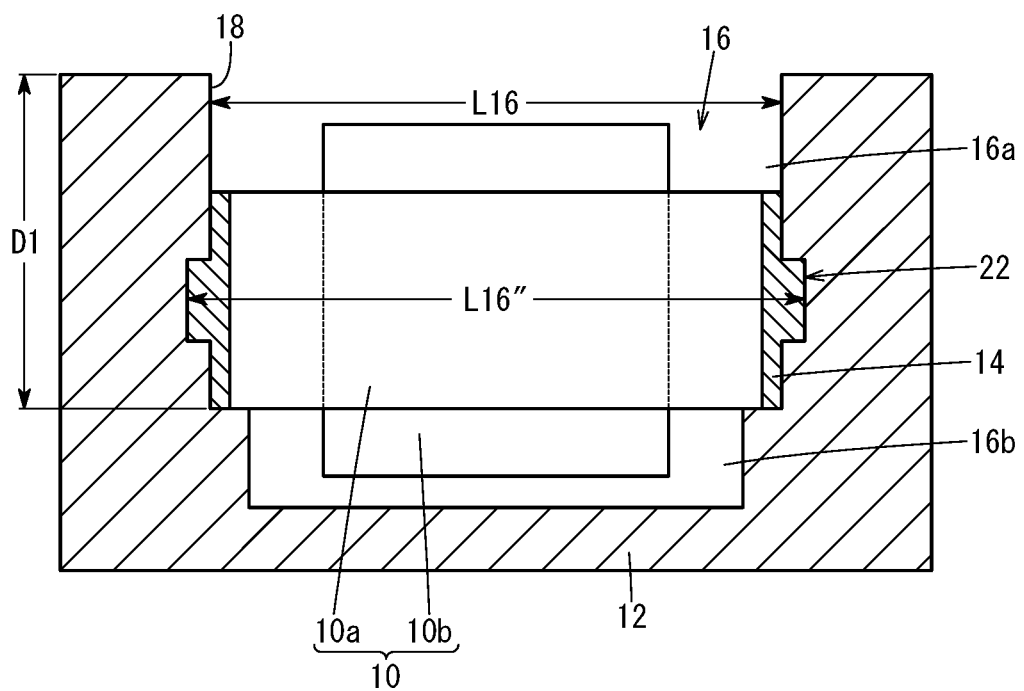
FIG. 4 is a cross section showing a stator incorporated in a jacket by a manufacturing method according to a first modification.

FIG. 4 is a cross section showing a stator 10 incorporated in a jacket 12 by a manufacturing method according to a first modification.

In the first modification, as shown in FIG. 4, for example, a recess 22 is formed in the surface of the hole 16 in the first region 16a, more specifically in a partial area of the surface that is parallel to the depth direction of the hole 16. In the example of FIG. 4, the recess 22 is shown as being formed in the shape of a ring extending in the entire circumference of the hole 16 in plan view, at a constant position in the depth direction of the hole 16. In this way, in the first modification, the adhesive reservoir where the adhesive stays is formed over the entire circumference of the hole 16.

The recess 22 may be formed in the hole forming step (preceding the insertion step) as mentioned earlier. Due to the formation of the recess 22, in the surface of the hole 16 facing the outer circumferential surface of the stator 10, the length (a second distance) of a diameter L16" of the hole 16 in the partial area is longer than the length (a first distance) of the diameter L16 of the hole 16 in the area other than the partial area. Thus, in the area where the adhesive reservoir resides (the partial area), the adhesive 14 introduced in the introduction step has a larger thickness in the radial direction than in the first embodiment. This further reduces the stress applied from the jacket 12 to the stator 10 in the area (the partial area) where the adhesive reservoir is formed.

The adhesive reservoir may be formed of two recesses 22 that face each other across the axis of the hole 16, in place of the recess 22 formed over the entire circumference of the hole 16. In this case, it is preferable to form each recess 22 such that they have line symmetry about the axis of the hole 16 when seen in cross section as shown in FIG. 4, so that the radial components of the stress applied from the jacket 12 to the stator 10 balance at any positions in the depth direction of the hole 16.

(Second Modification)

In the first embodiment, the adhesive 14 is introduced into the gap 20 after the stator 10 has been inserted in the hole 16. For example, the adhesive 14 may be previously applied to the surface of the hole 16 before the stator 10 is inserted into the hole 16. In this case, too, it is possible to reduce the stress applied from the jacket 12 to the stator 10 incorporated therein, as in the first embodiment.

(Third Modification)

Figure 5:
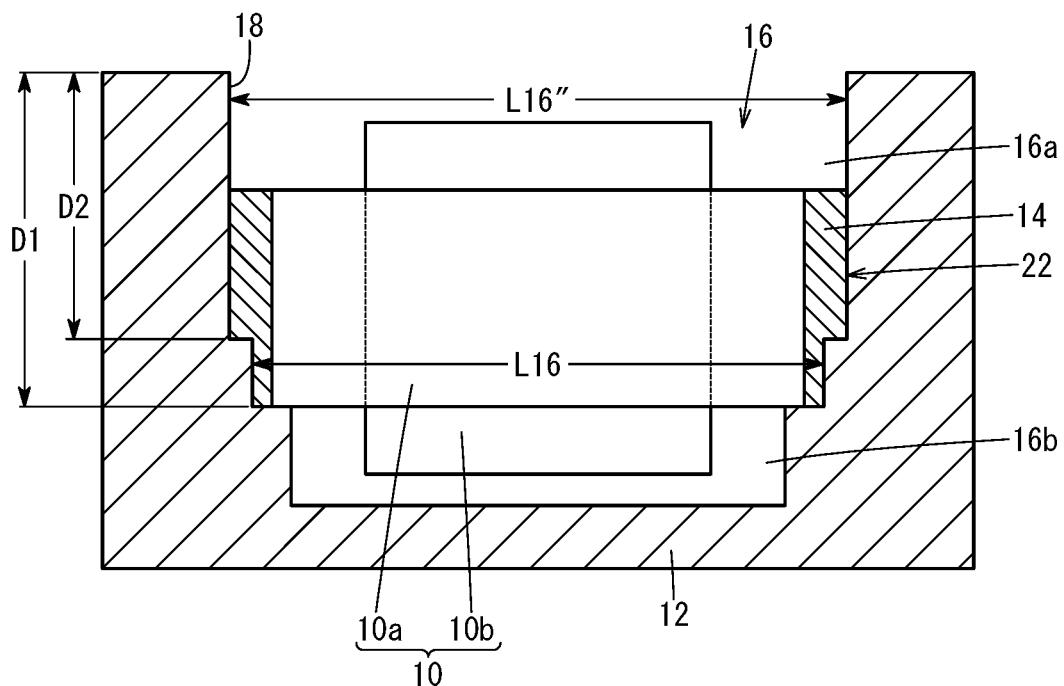
FIG. 5 is a cross section showing a stator incorporated in a jacket by a manufacturing method according to a third modification.

FIG. 5 is a cross section showing a stator 10 incorporated in a jacket 12 by a manufacturing method according to a third modification.

For example, a portion of the hole 16 that extends from the partial area to the opening end 18 of the jacket 12 may have a diameter of the second distance. For example, in FIG. 5, a portion of the hole 16 that extends from a second given depth D2 (a lower end of the partial area) to the opening end 18 has a diameter length corresponding to the second distance and another portion of the hole that extends deeper than the second given depth D2 has a diameter length corresponding to the first distance. As a result, an adhesive reservoir is formed in an area from the second given depth D2 to the upper end of the stator core 10a. According to the third modification, in the introduction step, the adhesive 14 can be introduced into the adhesive reservoir more easily than in the first modification.

[Technical Ideas Obtained from Embodiments]

Technical ideas that can be grasped from the embodiments and modifications described above will be recited below.

A method of manufacturing a motor jacket incorporating a stator (10) includes: an insertion step of inserting the stator (10) into a hole (16) formed in the jacket (12); an introduction step of, after the insertion step, introducing an elastic adhesive (14) into between an outer circumferential surface of the stator (10) and a surface of the hole (16); and a cooling step of cooling the jacket (12) for a given time after the introduction step.

It is thus possible to incorporate the stator (10) into the jacket (12) with the axis of the hole (16) of the jacket (12) and the axis of the stator (10) substantially coinciding with each other, and to reduce the stress applied from the jacket (12) to the stator (10).

The manufacturing method may further include, before the insertion step, a hole forming step of forming the hole (16) in the jacket (12), and, in the hole forming step, an adhesive reservoir may be formed in a partial area of the surface of the hole (16) that faces the outer circumferential surface of the stator (10). This enlarges the length of the adhesive (14) in the radial direction of the hole (16), thereby further reducing the stress applied from the jacket (12) to the stator (10).

In the hole forming step, the adhesive reservoir may be formed in the entire circumference of the hole (16). This further reduces the stress applied from the jacket (12) to the stator (10) on the entire circumference of the hole (16).

In the hole forming step, when, of the surface of the hole (16) facing the outer circumferential surface of the stator (10), an area other than the partial area has a diameter length of a first distance (L16) and the partial area has a diameter length of a second distance (L16"), the adhesive reservoir may be formed by making the second distance (L16") longer than the first distance (L16). This further reduces the stress applied from the jacket (12) to the stator (10) in the partial area in which the diameter length is the second distance (L16").

In the hole forming step, the hole (16) may be formed such that a portion of the hole that extends from the partial area to an opening end (18) of the jacket (12) has the diameter length of the second distance (L16"). This facilitates the introduction of the adhesive (14) into the adhesive reservoir.

What is claimed is:

1. A method of manufacturing a motor jacket incorporating a stator, comprising:
   an insertion step of inserting the stator into a hole formed in the jacket;
   an introduction step of, after the insertion step, introducing an elastic adhesive into between an outer circumferential surface of the stator and a surface of the hole; and
   a cooling step of cooling the jacket for a given time after the introduction step, the cooling step further including shrinking the jacket in a radial direction at a faster rate than the stator, thereby applying a radially pressing stress to the stator by the jacket and reducing a thickness of the elastic adhesive in the radial direction.

2. The method of manufacturing the motor jacket incorporating the stator according to claim 1, further comprising, before the insertion step, a hole forming step of forming the hole in the jacket, wherein, in the hole forming step, an adhesive reservoir is formed in a partial area of the surface of the hole that faces the outer circumferential surface of the stator.

3. The method of manufacturing the motor jacket incorporating the stator according to claim 2, wherein, in the hole forming step, the adhesive reservoir is formed in an entire circumference of the hole.

4. The method of manufacturing the motor jacket incorporating the stator according to claim 3, wherein, in the hole forming step, when, of the surface of the hole facing the outer circumferential surface of the stator, an area other than the partial area has a diameter length of a first distance and the partial area has a diameter length of a second distance, the adhesive reservoir is formed by making the second distance longer than the first distance.

5. The method of manufacturing the motor jacket incorporating the stator according to claim 4, wherein, in the hole forming step, the hole is formed so that a portion of the hole that extends from the partial area to an opening end of the jacket has a diameter length of the second distance.

6. The method of manufacturing the motor jacket incorporating the stator according to claim 2, wherein, in the hole forming step, when, of the surface of the hole facing the outer circumferential surface of the stator, an area other than the partial area has a diameter length of a first distance and the partial area has a diameter length of a second distance, the adhesive reservoir is formed by making the second distance longer than the first distance.

7. The method of manufacturing the motor jacket incorporating the stator according to claim 6, wherein, in the hole forming step, the hole is formed so that a portion of the hole that extends from the partial area to an opening end of the jacket has a diameter length of the second distance.

* * * * *